Feb. 3, 1959    R. E. DOE ET AL    2,871,970
METHOD AND APPARATUS FOR AMPLIFYING SEISMIC SIGNALS
Filed March 18, 1954
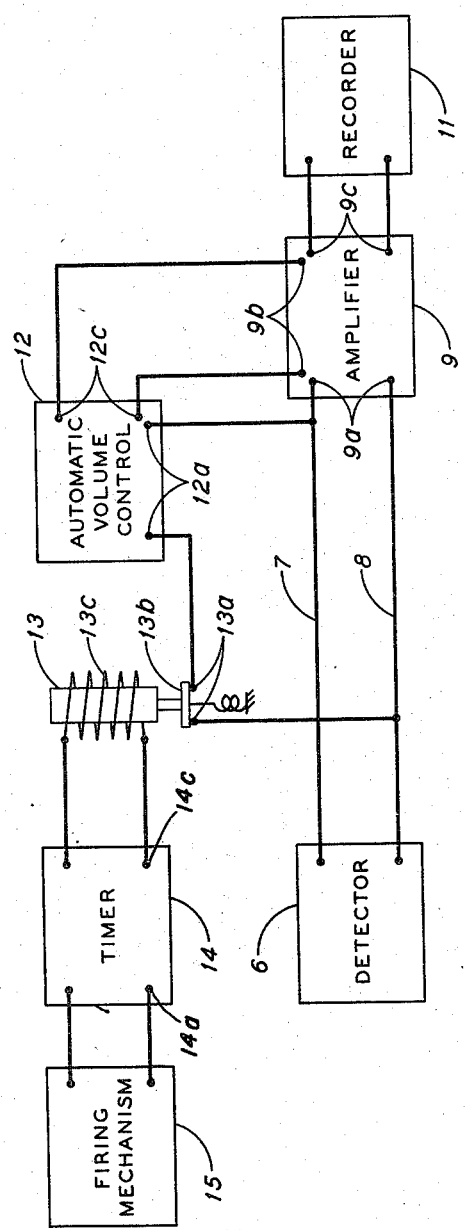
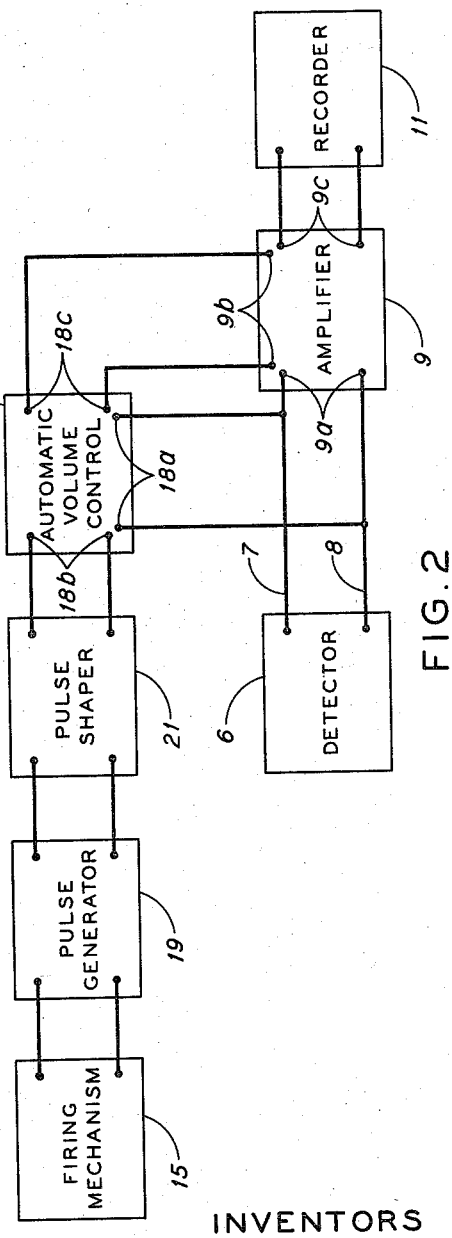
INVENTORS
ROBERT E. DOE
ROBERT E. DANIEL
GRAHAM C. ALVEY
BY
ATTORNEYS 2,871,970
Patented Feb. 3, 1959

2,871,970

METHOD AND APPARATUS FOR AMPLIFYING SEISMIC SIGNALS

Robert E. Doe, Robert E. Daniel, and Graham C. Alvey, Calgary, Alberta, Canada, assignors, by mesne assignments, to California Research Corporation, San Francisco, Calif., a corporation of Delaware Application March 18, 1954, Serial No. 417,185

2 Claims. (Cl. 181—.5)

This invention relates in general to seismic prospecting and, in particular, to methods and apparatus for amplifying and recording seismic detector signals.

In the art of seismic prospecting, the mechanical energy of seismic waves artificially generated in the ground is translated into electric impulses by means of a plurality of seismic wave detectors, and these impulses are amplified and recorded in some manner for analysis. Since the magnitude of the impulses generated by the detectors varies over a very substantial range during the period in which the seismic waves are detectable, some type of control of the gain with which the impulses are amplified is required to obtain amplified impulses having maximum limits lying within the limits of amplifying means and of the recording means and having minimum limits which will produce a legible record.

A number of methods have been proposed for effecting such control, such as the so-called pre-set gain or volume control systems, in which the gain of the amplifier is increased as a function of time. However, this method has disadvantages in that its effectiveness is sometimes impaired by the fact that the strongest impulses do not necessarily arrive first, when the amplification of the system is at its lowest value, or by the fact that the average amplitude of the impulses decreases as a function of time different from the function of time according to which the amplification has been set to increase.

In an additional method, the so-called automatic gain or volume control systems, the amplifier gain is varied as a function of the intensity or amplitude of the electrical impulses generated by the detectors. The automatic control systems, while being more desirable than the pre-set gain control systems, have the disadvantage of producing amplitude distortion owing to the lag between the actual variations in signal intensity and the response thereto of the automatic control system. Such amplitude distortion in an extreme case may result in the virtual suppression of a portion of a signal, such as in the case of a seismic signal in which a very weak reflection substantially immediately follows a very strong reflection. In such a case, the automatic control system, responding to the strong reflection, acts to reduce the gain of the amplifier and the lag in recovery of the volume control is such that the subsequent immediately-following weak reflection arrives at the amplifier at a time when the gain thereof is insufficient to produce a recognizable output signal, resulting in a loss of potentially valuable information on the record. This undesirable suppression can be reduced to some extent by decreasing the time constant of the automatic control system to decrease its response time, but such action has the disadvantage of further increasing the amplitude distortion introduced.

Briefly, the present invention contemplates a method and apparatus for amplifying a seismic detector signal which has a portion of large amplitude substantially immediately followed by a portion of relatively small amplitude, in which the advantages of fully automatic gain control are obtained by using automatic volume control to vary the amplification of the signal as some function of the signal amplitude until substantially the end of the portion of relatively large amplitude, and then the gain of the amplifier is abruptly increased independently of the automatic volume control during the occurrence of the portion of relatively small amplitude to amplify the portion of relatively small amplitude with increased gain. After occurrence of this portion of relaitvely small amplitude, the automatic volume control means again resumes control of the amplification in accordance with the signal amplitude.

It is therefore an object of this invention to provide improved methods and apparatus for amplifying a seismic detector signal.

It is an additional object of the present invention to provide a method for amplifying a seismic detector signal which has a portion of relatively large amplitude substantially immediately followed by a portion of relatively small amplitude, in which method automatic volume control is used to control the amplification of the signal as a function of signal amplitude until substantially the end of the portion of relatively large amplitude, and then the amplification of the signal is automatically increased independently of the automatic volume control during the occurrence of the portion of relatively small amplitude to amplify the portion of relatively small amplitude with increased gain.

It is a further object of this invention to provide a method of amplifying a seismic detector signal in which the amplification of the signal is normally varied as a function of signal amplitude by automatic volume control but in which the action of the automatic volume control is abruptly removed during a predetermined portion of the signal to amplify the predetermined portion of the signal with substantially maximum gain.

Objects and advantages other than those set forth above will be readily apparent from the following detailed description when read in conjunction with the accompanying drawings, in which Fig. 1 illustrates one embodiment of the invention in which the amplification of a seismic detector signal is controlled by automatic volume control means and in which electro-mechanical means are utilized to render the automatic volume control means inoperative during a predetermined portion of the detector signal.

Fig. 2 illustrates an alternate embodiment of the invention in which electronic means are utilized to render the automatic volume control inoperative for a predetermined portion of the detector signal.

Referring to Fig. 1 by character of reference, a suitable detector of seismic waves, shown schematically at 6, is utilized to provide an electrical output signal varying in sympathy with the seismic waves received at the detector. The output of detector 6 is connected through conductors 7 and 8 to the input terminals 9a of amplifying means 9, and the output terminals 9c of amplifier 9 are connected to a suitable recording and/or indicating device 11.

Since the amplitude of the signal from detector 6 varies over a range considerably exceeding the range of recorder 11, automatic volume control means are provided to control the gain of amplifier 9 to maintain the amplified signal from amplifier 9 within the minimum and maximum usable limits of recorder 11. Such automatic volume control means, shown schematically at 12, may be of any suitable known type responsive to the amplitude of the output signal of detector 6 and capable of controlling the gain of amplifier 9 in accordance with such amplitude. As shown, the input terminals 12a of automatic volume control means 12 are connected across conductors 7 and 8 through suitable switching means, such as an electromagnetic relay 13. The output signal from output terminal 12c of automatic volume control means 12 is supplied to input terminals 9b of amplifier 9 to control the gain of the amplifier in accordance with the amplitude of the output signal of detector 6, as is well known in the art.

Relay 13 is provided with a pair of contacts 13a connected in the input circuit of automatic volume control means 12 and bridged by a contact arm 13b. Relay 13 is also provided with an energizing winding 13c connected to the output terminals 14c of an adjustable timing device 14. The input terminals 14a of timing device 14 are in turn connected to the mechanism 15 for initiating the explosion which provides the seismic waves detected by detector 6. Timing device 14, in this instance, is of the type which energizes relay winding 13c at a predetermined time after actuation of the timer by mechanism 15 and which maintains winding 13c energized for a predetermined period and which then deenergizes winding 13c. Both the duration of the period in which winding 13c is energized and the length of time after actuation of timer 14 before winding 13c is energized are adjustable.

The method and apparatus of this invention are particularly adapted for seismic prospecting in areas in which the seismic detector output signal contains a portion of relatively large amplitude appearing subsequent to at least one portion of relatively small amplitude and closely or substantially immediately followed by another portion of small amplitude. An example of such an area is the Petitot River area of Canada, in which a reflection of abnormally large energy is received from the top of the Paleozoic zone subsequent to receipt of weaker reflections from overlying interfaces and followed by weaker reflections from underlying interfaces. In such areas, the use of amplifying and recording equipment employing the usual automatic volume control, in which the gain of the amplifier is continuously controlled as a function of the signal amplitude, may result in the loss of potentially valuable information owing to the suppression of the portion of relatively small amplitude closely following the portion of relatively large amplitude by the lag in the response of the automatic volume control means.

When the method of this invention is utilized in seismic prospecting in such an area, and assuming that the approximate time of arrival of the portion of relatively large amplitude is known, the operation of the embodiment illustrated in Fig. 1 is as follows. Prior to actuation of firing mechanism 15, timer 14 and winding 13c are deenergized, thereby maintaining contacts 13a bridged by contact arm 13b to connect automatic volume control means 12 across conductors 7, 8. Automatic volume control means 12 is so adjusted as to provide a minimum gain in amplifier 9 for a predetermined time after initiation of the seismic explosion so that the seismic waves of high amplitude which arrive at detector 6 shortly after the detonation of the explosive are amplified with a minimum gain in the amplifier 9. After this predetermined time of minimum gain, automatic volume control means 12 commences to control the gain of amplifier 9 as a function of the amplitude of the output of detector 6 to maintain the amplified output of amplifier 9 within the recording limits of recorder 11.

Upon actuation of firing mechanism 15, timer 14 is energized and commences its cycle. At a predetermined time after its energization, corresponding to the time in the detector signal at which substantially the end of the portion of relatively large amplitude occurs, timer 14 energizes winding 13c to open contacts 13a. Opening of contacts 13a disconnects automatic volume control means 12 from conductors 7 and 8 and thus renders volume control means 12 unresponsive to the output of detector 6. Amplifier 9 is adjusted so as to have substantially maximum gain in the absence of control by volume control means 12, so that disconnection of control means 12 causes the gain of amplifier 9 to increase to substantially its maximum value. During the period in which contacts 13a are thus open, the gain of amplifier 9 remains at substantially its maximum value, thereby resulting in maximum amplification of the portion of the output signal of detector 6 occurring during this period, independently of the operation of automatic volume control means 12.

This maximum amplification during this period results in the production of a record by recorder 11 in which the portion of the seismic detector signal of relatively small amplitude substantially immediately following the signal portion of relatively large amplitude is literally enlarged so as to aid in obtaining information which might otherwise be obscured. Both the duration of the period during which the automatic volume control means 12 is inoperative and the time of initiation of its inoperativeness may be controlled through timer 14 to provide for enlargement of any portion of the seismic signal. It will be understood that timer 14 may be so arranged as to render volume control means 12 inoperative more than once during the occurrence of a given signal if the nature of the signal is such that more than one portion thereof requires amplification with considerably increased gain.

Upon expiration of the predetermined period, timer 14 de-energizes winding 13c to thereby close contacts 13a and thus render automatic volume control means 12 again responsive to the amplitude of the output of detector 6 for controlling the gain of amplifier 9 in accordance therewith.

The embodiment illustrated in Fig. 2 is similar to that of Fig. 1, except that electronic means are utilized to render the automatic volume control means inoperative during a predetermined interval of time. The gain of amplifying means 9 is controlled by automatic volume control means 18 in response to the amplitude of the output signal from detector 6. Suitable electronic timing means, such as a pulse generator 19 and a pulse shaper 21, are provided to render the automatic volume control means 18 inoperative for a predetermined time during the occurrence of the output signal from detector 6.

Pulse generator 19 is actuated by firing mechanism 15 and, together with pulse shaper 21, operates to impress on imput terminals 18b of automatic volume control means 18 a pulse of adjustable time of origin and duration which abruptly renders control means 18 ineffective to control the gain of amplifier 9 during the duration of the pulse. Pulse generator 19 and pulse shaper 21 may operate on the automatic volume control means in any suitable known manner, such as by abruptly changing the grid bias or plate voltage of a vacuum tube therein.

The embodiment of Fig. 2 thus operates in a manner similar to the embodiment of Fig. 1 to abruptly render the automatic volume control means 18 ineffective for a predetermined time and increase the gain of amplifier 9 to substantially a maximum value to provide a record on an enlarged scale of the portion of the seismic detector signal occurring during this predetermined time.

Although but two exemplary embodiments of the present invention have been illustrated and described, it will be apparent to those skilled in the art that various changes and modifications may be made therein without departing from the spirit of the invention or the scope of the appended claims.

We claim:

1. The method for controlling the amplification of a signal from a seismic detector to provide a record of said signal containing some portions representing said signal as modified by an automatic volume control and other portions representing said signal unmodified by said automatic volume control in which the signal from the seismic detector is passed through an amplifier which has an automatic volume control connectible to it to control the amplitudes of signals sent from the amplifier to a recorder, the improvement comprising periodically disconnecting and subsequently reconnecting the automatic volume control and the amplifier at predetermined times and for predetermined time intervals while the record is being made to provide a seismic record which has preselected portions which are free from the effects of said automatic volume control interspersed between preselected portions of said record which are affected by said automatic volume control.

2. Apparatus for controlling the amplification of a signal from a seismic detector to provide a record of said signal containing some portions representing said signal as modified by an automatic volume control and interspersed other portions representing said signal unmodified by said automatic volume control comprising a seismic detector, an amplifier connected to said seismic detector to receive and amplify electric signals therefrom, an automatic volume control means connectible to said amplifier, means to initiate a seismic disturbance, a timing device connected to the last said means to be placed in operation when said seismic disturbance is initiated, means operated by said timing device alternately to connect said automatic volume control to said amplifier to control the amplitude of signals sent from said amplifier to a recorder and to disconnect said automatic volume control from said amplifier, and means to preset said timing device to connect and disconnect said automatic volume control and said amplifier during preselected interspersed intervals while said record is being made to provide preselected intervals of said record which are free from the effects of said automatic volume control interspersed between preselected intervals of said record which are affected by said automatic volume control.

References Cited in the file of this patent

UNITED STATES PATENTS

| | | |
|---|---|---|
| 2,244,695 | Hathaway | June 10, 1941 |
| 2,286,106 | Ritzmann | June 9, 1942 |
| 2,420,571 | Shimek et al. | May 13, 1947 |
| 2,457,214 | Doll | Dec. 28, 1948 |
| 2,489,126 | Fay et al. | Nov. 22, 1949 |
| 2,547,703 | Hermont et al. | Apr. 3, 1951 |
| 2,558,954 | Henson | July 3, 1951 |
| 2,582,714 | Meier | Jan. 15, 1952 |
| 2,656,422 | Loper | Oct. 20, 1953 |